June 7, 1932.  R. H. WAPPLER  1,861,769
CATHETERIZING INSTRUMENT
Filed June 27, 1930
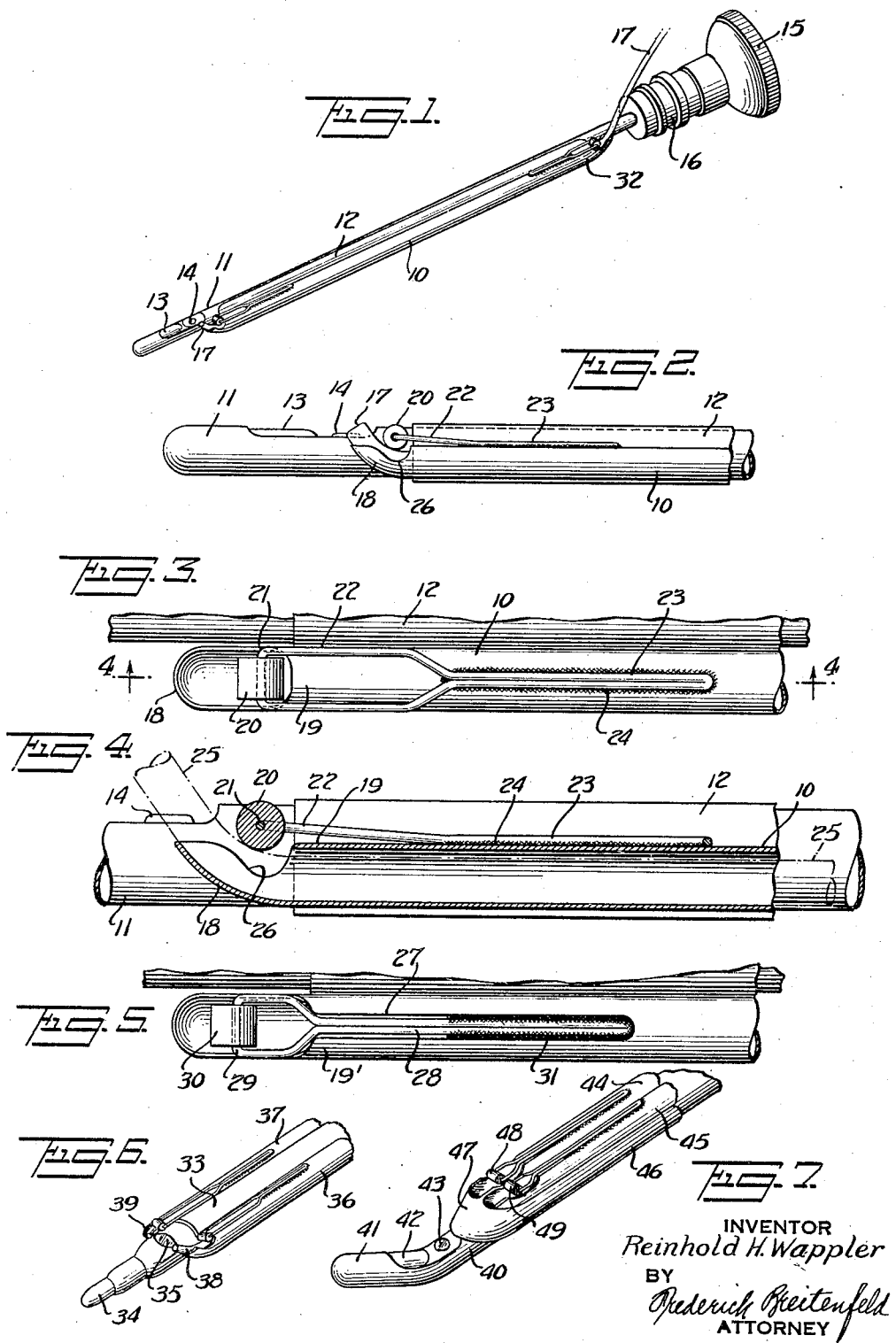
INVENTOR
Reinhold H. Wappler
BY
Frederick Breitenfeld
ATTORNEY Patented June 7, 1932

1,861,769

UNITED STATES PATENT OFFICE

REINHOLD H. WAPPLER, OF YONKERS, NEW YORK

CATHETERIZING INSTRUMENT

Application filed June 27, 1930. Serial No. 464,150.

My present invention relates generally to surgical instruments, and has particular reference to that type of instrument which is adapted to permit the employment of a catheter.

It is a general object of my invention to improve the accuracy, reliability, and efficiency of catheterizing instruments in general; and it is a more particular object to provide a construction which facilitates accurate deflection and guidance of a catheter into a predetermined direction.

More specifically, my invention has reference to a catheter tube, i. e., a tube adapted to receive a catheter for the purpose of permitting the forward end of the catheter to be projected out of the outlet end of the tube for customary purposes. Where the instrument is of a character which is to be used in extremely small or inaccessible passages of the human body, it is not always feasible to provide mechanical deflecting means for the forward end of the catheter. On the other hand, the provision of an abutment surface or deflecting portion at the forward or outlet end of a catheter tube is not entirely satisfactory nor accurate, because the deflection will depend in a large measure upon the thickness of the catheter which is employed. If the catheter is almost equal in thickness to the capacity of the tube through which it is pushed, the forward end will in most cases be deflected by a greater degree than would be the case if the catheter had a smaller diameter or thickness.

My present invention provides a construction which permits accurate deflection of catheters, regardless of size, and without the necessity for mechanical deflecting mechanism or the like.

Although my invention is not restricted to any particular type of catheterizing instrument, it is of particular and special importance in connection with an instrument designed for the catheterization of the ejaculatory ducts. The need for an instrument which permits catheterization of these ducts has long been felt. The difficulties encountered lie in the extreme inaccessibility of the outlets of the ducts, of the smallness of the passage, and of the smallness of the duct outlets themselves. These outlets lie in symmetrical relationship upon the verumontanum in the prostatic portion of the urethra, opening into the sinus pocularis. An instrument of extreme compactness is required, and unless the catheter can be guided accurately and expeditiously in a predetermined direction, the catheterizing procedure is extremely difficult.

It is a more specific object of my invention to provide an instrument which is designed primarily for the foregoing purpose, and one of the main features lies in the combination with a telescope tube of a pair of catheter tubes arranged alongside of the telescope and having their outlet ends symmetrically positioned adjacent to and on opposite sides of the objective of the telescope. Each catheter tube has at its outlet end a deflector adapted to guide a catheter into the field of vision commanded by the telescope, and my present invention, so far as the guidance of catheters is concerned, makes it possible to employ two catheters simultaneously, one in each catheter tube, the pair of catheters being symmetrically deflected by the same degree, regardless of the particular size of each catheter.

Another general object of my invention lies in providing a catheter tube with a rounded guiding member which obviates the disadvantage heretofore encountered in catheterizing instruments caused by the shaving or scraping of the catheters during the withdrawal thereof. Where the outlet end of a catheter tube is provided with a sharp edge, the withdrawal of the catheter scrapes or shaves the catheter; and, apart from the undesirability of leaving particles of foreign matter within the body, catheters of the character referred to are relatively expensive.

Briefly, one feature of my invention lies in providing a catheter tube which has one wall thereof at the outlet end extended and arched to provide a deflecting surface or abutment, and in arranging a rounded guiding member of a resilient character at the opposite or shorter wall of the outlet end, whereby a catheter will be yieldably pressed against the extended or deflecting wall.

For the attainment of the foregoing objects and such other objects as may hereinafter appear or be pointed out, I have illustrated my invention in a general way in the accompanying drawing; and by way of illustration and for the sake of simplicity I have illustrated a naso-pharyngoscope, although it will be understood that my invention is in no wise limited to an instrument of this specific character and is, from other aspects, directed more specifically to a catheterizing instrument for the ejaculatory ducts.

In the accompanying drawing,—

Figure 1 is a perspective view of a naso-pharyngoscope to which my invention has been applied;

Figure 2 is an enlarged side elevational view of the forward portion of Figure 1;

Figure 3 is a plan view of Figure 2;

Figure 4 is a cross-sectional view taken substantially along the line 4—4 of Figure 3;

Figure 5 is a view similar to Figure 3, showing a modification;

Figure 6 is a fragmentary perspective view of my invention applied to an instrument designed for catheterizing the ejaculatory ducts; and Figure 7 is a fragmentary perspective view of an instrument designed for the catheterizing of the ureters.

In Figure 1, I have illustrated the general relationship which would exist between a catheter tube 10 of the present character and a telescope tube 11. A resilient fin or the like 12 may be attached to the tube 10 to facilitate mounting the same alongside of the tube 11.

In the instrument of Figure 1 the telescope tube 11 is substantially straight and is provided with the customary lamp 13 and the objective lens 14 at its forward end. At the rear end I have illustratively shown an eye-piece 15 and an electric contact portion 16 to which suitable connections may be made in the usual manner.

The catheter tube 10 is arranged alongside of the telescope 11 in such a manner that the outlet end of the catheter tube is adjacent to the objective 14, so that a catheter 17 inserted through the tube 10 may be caused to emerge from the outlet end of the catheter tube and enter the field of vision of the objective 14.

Referring for the moment to Figures 2—4, it will be noted that I have provided the catheter tube, at its outlet end, with an extended and arched wall 18, this wall thereby serving as a deflecting surface or abutment for guiding the forward end of the catheter laterally out of the catheter tube.

In accordance with my present invention, I mount upon the opposite or shorter wall 19 of the catheter tube a rounded and resilient guiding member which I have shown in the form of a roller 20. The roller may be mounted upon a spindle 21 formed integrally with a resilient stem 22 extending rearwardly. In the form illustrated, I have shown the employment of a resilient wire or similar metallic element to serve as the stem 22, and it is to be noted that this wire is doubled back upon itself at its rear end. More particularly, it is to be noted that the rear portion 23 of the stem 22 is relatively narrow and is rigidly attached to the wall 19 as by means of solder or the like 24.

The stem is adapted to yield outwardly in a resilient manner from the forward end of the attached portion 23, and I have illustratively shown in Figure 4 the manner in which this stem will yield when a catheter (indicated by the dot-and-dash lines 25) is pushed through the tube.

Under normal conditions, the entire stem 22 lies substantially flat alongside of the wall 19, and the roller 20 is accommodated in a normal position by providing the lateral walls of the catheter tube outlet with cut-outs or depressions 26. When a catheter is pushed through the tube, it forces its way past the roller 20, and the latter thereupon exerts a yieldable yet active pressure upon the concaved side of the catheter, thereby forcing the latter firmly against the curved or arched wall 18. Any catheter, regardless of its diameter, will be pressed in this manner against the wall 18, and as a result, the catheter will emerge from the catheter tube at a certain predetermined lateral angle which will always be the same. Accordingly, if the catheter tube is properly mounted with respect to the telescope and with respect to the field of vision which the telescope commands, the insertion of a catheter through the tube will always result in having its forward end project into the field of vision at exactly the same point and at a certain predetermined angle.

In Figure 5, I have illustrated a slight modification wherein the wall 19' has been provided with a longitudinal slit 27 extending rearwardly from the forward edge. The stem is provided with a relatively narrow portion 28 which is accommodated within the slit 27, and the stem does not widen out to form the axis 29 of the roller 30 until it emerges from the forward end of the slit 27. This modification illustrates merely a compact manner of accommodating and mounting the stem and roller, and it is to be noted that only the rear portion of the stem 28 is soldered or similarly attached in position, as at 31. This leaves the forward portion of the stem free of the tube and resiliently yieldable, as pointed out before.

In Figure 1, I have illustrated my invention in connection with a naso-pharyngoscope; and since, in an instrument of this character, it is desirable to remove the catheter tube 10 and then reapply it in reversed condition, it happens that the rear portion 32 has been shown provided with a similar rounded guiding member. It will be understood, however, that my invention has no particular significance with respect to the inlet end of a catheter tube, and the only reason why it happens to be shown at the inlet end in Figure 1 is because this end 32 may be employed at a subsequent time as the outlet end of the tube 10.

My invention is of particular importance in connection with instruments of the character illustratively shown in Figures 6 and 7. In Figure 6, I have shown the forward end of a telescope tube 33, this tube being of a different character from that of Figure 1, and being constructed substantially in accordance with my Patent No. 1,680,491. The telescope has an electric lamp 34 at its extreme forward end, and it is provided with an objective 35 which commands a forwardly oblique field of vision. I have shown the manner in which I prefer to mount a pair of catheter tubes 36 and 37 upon the telescope 33. Each of these tubes is provided at its forward end with a rounded resilient guiding member of the character herein described, and the tubes are symmetrically mounted on opposite sides of the telescope 33 so that a pair of catheters 38 and 39 may be simultaneously guided into the field of vision from opposite sides thereof and at exactly symmetrical angles. An instrument of this character has proven highly satisfactory in connection with the catheterization of the ejaculatory ducts.

In Figure 7, I have shown a further useful application of my invention. A telescope 40 is provided with a bent forward nose 41 within which the customary lamp 42 is mounted. An objective 43 commands a lateral field of vision. Mounted upon the tube 40 are the two catheter tubes 44 and 45, these tubes being, if desired, rigidly attached to each other side by side and mounted upon a fin 46 or the like for removable association with the tube 40. The fin 46 is shown with a beveled forward face 47 which is provided for the purpose of permitting smooth insertion of the instrument into the body.

A pair of catheters inserted through the tubes 44 and 45 will emerge alongside of each other and enter the field of vision of the telescope. Regardless of the relative sizes of the catheters, they will be caused to emerge at exactly the same angles, this result being accomplished by the provision of yieldable guide rollers 48 and 49, as hereinbefore described. An instrument of this character is of particular usefulness in catheterizing the ureters.

In addition to the advantages hereinbefore noted, it will be observed that the provision of a yieldable and rounded guiding member at the forward end of the catheter tube serves the added purpose of preventing damage to the catheters. When a catheter is withdrawn from an instrument of the present character, there is no danger of scraping the same upon any sharp edge of the catheter tube, and, as a result, my instrument is more efficient and sanitary and the lives of the catheters are increased.

In general, it will be noted that my invention is of an extremely simple yet highly important character, rendering possible the relatively simple catheterization of portions of the body which are extremely inaccessible. As to certain phases of my invention, it will be obvious that it is not limited in its application to any particular type of catheterizing instrument.

It is to be understood that wherever the term "catheter" has been used herein and in the appended claims, it is intended to signify any type of flexible instrument of the same general character, and the invention is not restricted to the employment of those particular instrumentalities which are usually and technically referred to in a more restricted sense as "catheters".

Furthermore, it will be understood that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. A catheter tube having one wall extended at its outlet end to form a deflecting abutment, and provided with a guide roller on the opposite wall.

2. A catheter tube having one wall of its outlet end extended and arched to provide a deflecting surface, and provided with a rounded yieldable guide member at the extreme edge of the opposite wall.

3. A catheter tube provided with a resilient rounded guide member at its outlet end and a deflector opposite said member, said member being adapted to bear yieldably against a catheter emerging from said outlet end to urge the catheter toward the deflector.

4. A catheter tube having one wall extended at its outlet end to form a catheter-deflecting abutment, and provided with a resilient rounded guide member at the opposite wall, said member being adapted to bear yieldably against the concave side of a catheter emerging from said outlet end and deflected by said abutment.

5. A catheter tube provided with a guide roller at the edge of one wall at the outlet end, and means for yieldably urging said roller in the direction of the opposite wall, whereby a catheter pushed through the tube will be yieldably pressed against said opposite wall.

6. A catheter tube provided with an extended and arched wall at the outlet end, whereby said wall serves as a deflector for a catheter emerging from said end, a guide roller at the forward edge of the opposite or shorter wall, and means for yieldably urging said roller toward the extended wall, whereby a catheter pushed through the tube will be yieldably pressed against said deflecting wall.

7. A catheter tube having at its outlet end a deflector on one wall, and means on the opposite wall for yieldably pressing a catheter against said deflector.

8. A catheter tube having one wall of its outlet end extended to form a deflector for a catheter, a rounded guide member on the forward edge of the opposite or shorter wall, and a resilient stem extending rearwardly from said guide member, said stem supporting said member at its forward end and being rigidly attached to the catheter tube at its rear end.

9. A catheter tube having one wall of its outlet end provided with a deflector and the opposite wall with a slot, a stem in said slot and rigidly attached at its rear end to said wall, and a rounded guide member carried by the forward or unattached end of said stem.

10. A catheter tube having one wall extended at its outlet end to form a deflecting abutment for a catheter, a guide roller at the edge of the opposite wall, and a resilient stem supporting said roller and extending rearwardly therefrom.

11. A catheter tube having one wall extended at its outlet end to form a deflecting abutment for a catheter, the opposite wall having a longitudinal slot therein extending rearwardly from its forward edge, a guide roller at said forward edge with its axis perpendicular to that of the tube, and a resilient stem supporting said roller and snugly accommodated within said slot.

12. In a catheterizing instrument, a telescope commanding an obliquely forward field of vision, a catheter tube mounted alongside of said telescope with its outlet end adjacent to the objective of the telescope, one wall of the catheter tube being extended and arched at said outlet end so as to deflect a catheter into said field of vision, and yieldable means on the opposite wall of said catheter tube for pressing said catheter against said extended wall; whereby all catheters, regardless of size, will be accurately deflected in the same degree.

13. In a catheterizing instrument, a telescope commanding an obliquely forward field of vision, a pair of catheter tubes mounted alongside of said telescope and on opposite sides of the objective of said telescope, each catheter tube having its outlet end adjacent to said objective, one wall of each catheter tube being extended and arched at its outlet end so as to deflect a catheter into said field of vision, and yieldable means on the shorter wall of each catheter tube for pressing said catheter yieldably against said extended wall; whereby a pair of catheters, regardless of size, may be accurately deflected into said field of vision from opposite sides thereof, respectively, and at equal angles to the axis of said field of vision.

14. An instrument for the catheterization of the ejaculatory ducts, comprising a telescope tube, a pair of symmetrical catheter tubes mounted alongside of the telescope tube with their outlet ends adjacent to and on opposite sides of the objective of said telescope, each catheter tube having a deflector at its outlet end for deflecting a catheter into the field of vision commanded by said objective, the deflectors being symmetrical, and yieldable means carried at the outlet end of each catheter tube for yieldably pressing the catheters against their respective deflectors; whereby a pair of catheters may be simultaneously projected into said field of vision from opposite sides thereof, each catheter, regardless of its size, being deflected to the same degree as the other, the catheters being thereby adapted to enter said ducts, respectively.

In witness whereof I have signed this specification this 18th day of June, 1930.

REINHOLD H. WAPPLER.